UNITED STATES PATENT OFFICE.

MAX CONRAD, OF ASCHAFFENBURG, AND WALTER BECKH, OF DARMSTADT, GERMANY.

PROCESS OF MAKING PYRIMIDIN DERIVATIVES.

No. 811,829. Specification of Letters Patent. Patented Feb. 6, 1906.

Original application filed November 3, 1904, Serial No. 231,267. Divided and this application filed October 24, 1905. Serial No. 283,769.

*To all whom it may concern:*

Be it known that we, MAX CONRAD, professor of chemistry and doctor of philosophy, residing at Aschaffenburg, and WALTER BECKH, doctor of philosophy, residing at Darmstadt, Germany, subjects of the German Emperor, have invented certain new and useful Improvements in the Manufacture of Pyrimidin Derivatives, of which the following is a specification.

This invention has for its object the production of pyrimidin derivatives having the constitution denoted by alkyl-4-imino-2.6-dioxypyrimidin.

It consists in a process of condensing cyanacetic-acid esters with alkyl derivatives of acidyl-ureas, such as symmetrical methyl-acetyl-urea or acetyl symmetrical dimethyl-urea, in the presence of condensing agents, such as the alkali alcoholates, the alkali metals themselves, or their amids.

The following equation may serve to illustrate the principal reaction which takes place in the above-mentioned condensation and which is characterized by a contemporary splitting off of the acidyl groups:

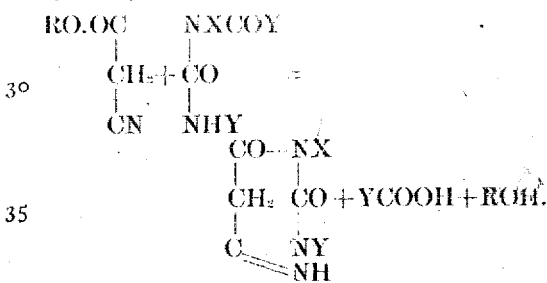

In this equation R and X are alkyl groups, and Y Y either hydrogen or any known alkyl group, only one of them, or both.

The essential characteristics of the process thus indicated will be seen from what is common to the following specific examples:

Example 1: One hundred and thirteen parts of cyanacetic-acid ethyl ester are under proper refrigeration united with twenty parts of xylol, in which 4.6 parts of sodium are finely distributed and one hundred and sixteen parts of symmetrical methyl-acetyl-urea are added. The sodium for the most part gradually goes into solution. Thereupon for several hours longer the mixture is heated to about 100° to 120° centigrade. Then the melt is carefully taken up with water, the xylol is removed, and the 3-methyl-4-imino-2.6-dioxypyrimidin, which is formed, is precipitated with acetic acid.

Example 2: One hundred and sixteen parts of acetyl-methyl-urea are brought into reaction with one hundred and thirteen parts of cyanacetic-acid ethyl ester and forty-six parts of sodium in solution in absolute alcohol. After several hours heating at about 70° to 80° centigrade the fluid stiffens to a thick paste consisting in the main of the sodium salt of 3-methyl-4-imino-2.6-dioxypyrimidin. The latter is converted into the free base in the usual manner.

The process proceeds in an analogous manner for the production of other alkyl-4-imino-2.6-dioxypyrimidin derivatives by condensing other acidyl derivatives of alkyl-ureas, such as acetyl symmetrical dimethyl-ureas or the like, with cyanacetic-acid esters in the above-mentioned manner.

Having now described our invention and in what manner the same is to be performed, what we claim as new, and desire to secure by Letters Patent, is—

1. The process of producing alkyl-4-imino-2.6-dioxypyrimidins of the above-given general formula, which process consists in condensing acidyl-alkyl-ureas of the above-characterized kind and cyanacetic-acid ester in the presence of alkali condensing agents and contemporary splitting off of the acidyl groups.

2. The process of producing alkyl-4-imino-2.6-dioxypyrimidins of the above-given general formula, which process consists in condensing acetyl-alkyl-ureas of the above-characterized kind with cyanacetic-acid esters in the presence of alkali condensing agents.

3. The process of producing alkyl-4-imino-2.6-dioxypyrimidins of the above-given general formula, which process consists in condensing acetyl-alkyl-urea of the above-characterized kind with cyanacetic-acid ethyl ester in the presence of an alkali condensing agent.

4. The process of producing 3-methyl-4-imino-2.6-dioxypyrimidin, which process consists in condensing acetyl-methyl-urea with cyanacetic-acid ethyl ester in the presence of an alkali condensing agent.

MAX CONRAD.
WALTER BECK.

Witnesses:
WALTER HOUSING,
ERNST MENNEL.